United States Patent [19]
Brownjohn

[11] Patent Number: 5,212,751
[45] Date of Patent: May 18, 1993

[54] SCREENING ARRANGEMENT FOR CONNECTORS

[75] Inventor: Nicholas E. Brownjohn, Droitwich, England

[73] Assignee: Lucas Industries public limited company, England

[21] Appl. No.: 825,207

[22] Filed: Jan. 24, 1992

[30] Foreign Application Priority Data

Jan. 30, 1991 [GB] United Kingdom ............... 9102006

[51] Int. Cl.⁵ ............................................. G02B 6/36
[52] U.S. Cl. ............................................. 385/75
[58] Field of Search ........................ 385/75, 88–94

[56] References Cited

U.S. PATENT DOCUMENTS 3,878,397  4/1975  Robb et al. ........................ 385/88
4,840,451  6/1989  Sampson et al. .................. 385/88
4,913,511  4/1990  Tabalba et al. ................... 385/88
4,979,787  12/1990  Lichtenberger .................. 385/88

FOREIGN PATENT DOCUMENTS 0238459  8/1986  Fed. Rep. of Germany ...... 385/140

Primary Examiner—John D. Lee
Assistant Examiner—John Ngo
Attorney, Agent, or Firm—Jenner & Block

[57] ABSTRACT

A screening arrangement is provided for attachment to the rear of a connector having one or more poles for receiving an optical fibre. The screening arrangement comprises a conductive housing and a conductive sleeve for the or each optical fibre. The or each conductive sleeve is electrically connected to the conductive housing and acts as a waveguide attenuator. The conductive housing is closed, for instance by transverse plates, about the conductive sleeve or sleeves so as to form a Faraday cage on the rear of the connector pierced only by the waveguide attenuators.

15 Claims, 3 Drawing Sheets

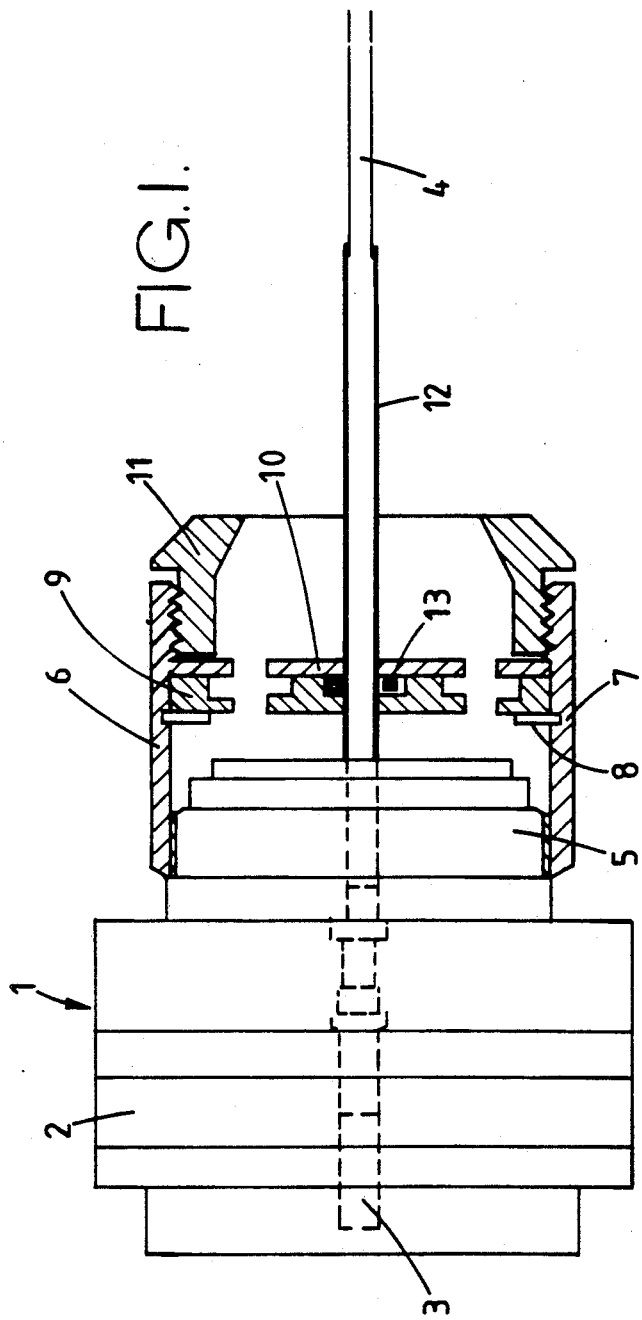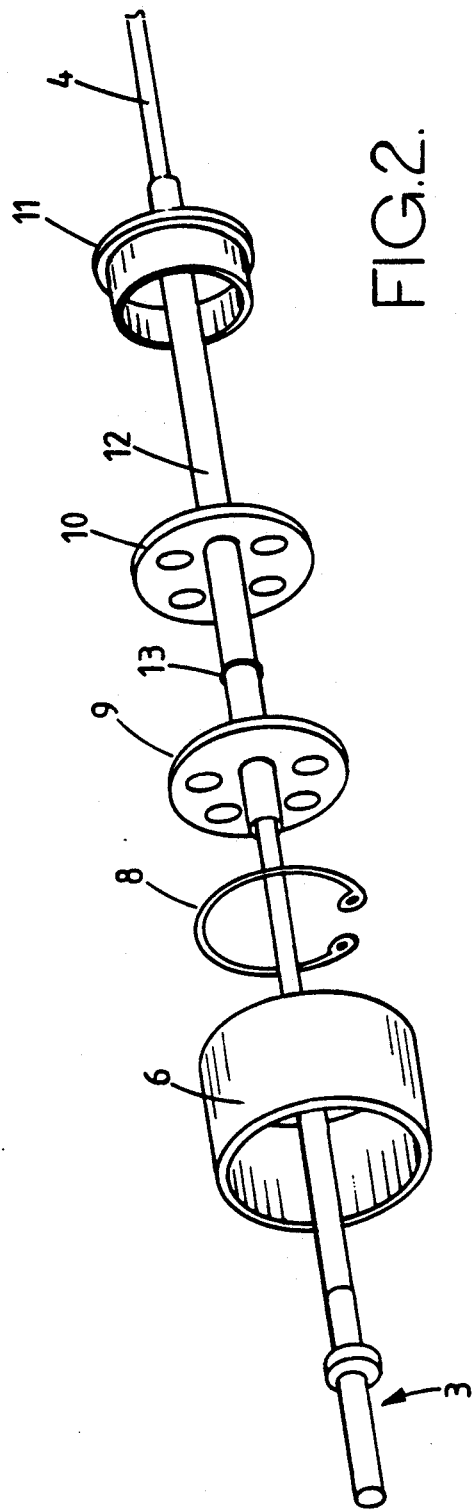

SCREENING ARRANGEMENT FOR CONNECTORS

The present invention relates to a screening arrangement for a connector.

Electrical wires carrying information are susceptible to electro-magnetic interference, such as radio frequency interference. It has therefore become more common for such electrical wires to be replaced by optical fibres which are substantially immune to electro-magnetic interference. In particular, the use of optical fibres for interconnecting parts of control systems in the aerospace industry has become more common.

Optical fibres have to be mountable and demountable to housings containing electronic circuits, and it is known to adapt military circular connectors such that they have optical poles instead of or in addition to electrical poles. For instance, it is possible to replace one or more electrical poles or "pins" of such a connector with a modified pole providing optical coupling to a corresponding pole of a mating connector. Alternatively, it is possible to house an opto-electrical transducer in a modified connector pole so as to receive an optical fibre end and convert the information carried by the fibre into an electrical signal, which is then electrically coupled to the mating connector.

The electronic circuits are housed in a metal enclosure which acts as a Faraday cage and provides good screening from interference and from the environment. The poles or pins of the mating connectors are spaced by an insulating body, for instance of rubber, and this represents a "hole" in the Faraday cage through which interference can pass and affect the electronic circuits. Thus, although optical fibres are substantially immune to such interference, the use of optical fibres can substantially impair the screening or shielding of electronic circuits.

EP 0 267 074 discloses a connector arrangement for optical fibres in which a metal screening plate is provided to reduce the passage of interference. Holes are formed in the screening plate for passage of the optical fibres. Thus, the unscreened area through which interference can pass is reduced to the area of the holes.

EP 0 320 214 discloses a connector arrangement in which a housing mounted connector has a metal shell for cooperating with a mating cable end connector having a plastics shell. The metal shell of the housing mounted connector has projecting metal tubes for receiving the ends of optical fibres which terminate in the cable end mounted connector. Metal eyelets in the form of short metal sleeves are fixed on the fibres near to the fibre ends. The screening is thus extended along the fibres by what amount to short waveguide attenuators which attenuate interference.

GB 2 243 224 discloses an optical fibre connector for fixing to the wall of an enclosure. A metallic shell which is fixed to the enclosure wall contains an elastomeric insert which is absorptive of microwave energy at wavelengths similar to the size of the aperture defined by the shell. Optical fibre ends are inserted into short metal ferrules which are in turn inserted into the insert. The ferrules are too short to act as waveguide attenuators to any significant degree.

Although these known arrangements provide improved screening from interference, they can only be implemented in existing connectors by extensive modification or redesign. This not only increases the cost of manufacture but can give rise to serious problems in applications where officially approved connectors have to be used. For instance, in those industries where connectors meeting military or other specifications must be used, modification or redesign of approved connectors means that fresh approval has to be obtained. This is expensive and time consuming, and meanwhile optical fibres can only be terminated in connectors with relatively poor interference screening.

According to the invention, there is provided a screening arrangement for a connector having a front end for mating with a mating connector, a rear end, and a pole for receiving an optical fibre entering the connector through the rear end, the screening arrangement comprising a conductive housing arranged to be attached to the rear end of the connector, and a conductive sleeve for passage of the optical fibre, the conductive sleeve being electrically connected to the conductive housing and acting, in use, as a waveguide attenuator, the conductive housing being substantially closed about the conductive sleeve.

For a connector having a plurality of optical poles for connection to a plurality of optical fibres, there may be provided a respective conductive sleeve for each fibre.

The conductive housing may have a circular cross-section and may have screw threads for fixing to a threaded metal shell of the connector.

The housing may have a transverse conductive plate provided integral with the housing or as a separate component having a peripheral portion fixed and electrically connected to the remainder of the housing. Alternatively, a conductive insert with a through-bore for the or each sleeve may be provided.

The housing may be made of metal, such as stainless steel, aluminium, or an aluminium alloy or a suitable composite material, such as a conductive light weight high temperature plastic. The sleeve may be metal or may comprise a heat-shrinkable conductive sleeve.

Preferably the sleeve has a collar clamped between the plate and a further plate, which may be of similar construction to the plate. The collar may be formed integrally with the sleeve or may comprise a separate ring, for instance of shape memory effect alloy. A recess may be formed in one or both of the plate and the further plate for receiving the collar.

Preferably the sleeve extends out of a fibre entry end of the housing.

Preferably the outer surface of the sleeve is in electrical contact with substantially the whole of an edge of the plate defining the hole.

Such an arrangement may be used with a chassis or enclosure mounted connector, but is preferably used with a cable or harness end mounted connector.

It is thus possible to provide a screening arrangement which reduces or prevents interference, such as electro-magnetic interference, passing through mating connectors for connecting one or more optical fibres to equipment. The screening arrangement can be fixed to the "rear" of the connector without requiring any modification or redesign thereof. The sleeve may form a tight fit over an optical fibre with the housing being closed around and in electrical contact with the or each sleeve. Thus, the shielding of an equipment enclosure can be substantially completed, the only "hole" being represented by the conductive sleeve which can be made sufficiently small in diameter to provide large amounts of attenuation to electro-magnetic interference up to frequencies of tens of gigahertz. Thus, optical fibres can be used with conventional military specification connectors without substantially degrading the screening of the equipment to interference.

The invention will be further described, by way of example, with reference to the accompanying drawings, in which:

FIG. 1 is a part-sectional view of a connector and screening arrangement constituting a first embodiment of the invention;

FIG. 2 is an exploded view of the screening arrangement of FIG. 1;

Figure 3:
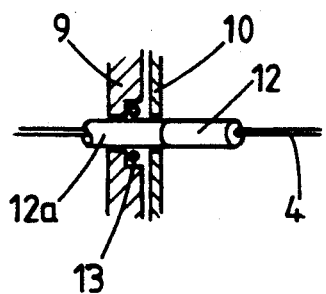
FIGS. 3 and 4 are sectional views of modifications to the screening arrangement of FIG. 1.

The connector 1 shown in FIG. 1 (of type number MIL-C-83723) comprises a metal shell 2 containing an insulating body for spacing a plurality of poles or pins for making connections with a mating connector mounted on an equipment enclosure. The connector 1 is intended for cable-end or harness-end mounting. One of the poles 3 of the connector 1 is shown in broken lines in FIG. 1 and has a tip of conventional coaxial electrical type for contacting a mating electrical pole in the enclosure-mounted connector. The pole 3 is, however, modified to include an opto-electrical transducer, which converts an optical information signal from an optical fibre 4 into corresponding electrical signals for the tip of the pole, or an electro-optical transducer, which converts an electrical signal from the enclosure-mounted connector into a corresponding optical signal for the fibre.

The rear or cable-entry end of the connector 1 has an externally threaded portion 5 to which is screwed a metal back shell 6 in the form of a cylinder with internally threaded ends. The internal wall of the back shell 6 has a groove 7 containing a circlip 8 against which a plate 9 abuts. The plate 9 has a hole or bore for the passage of each optical fibre 4 or electrical wire, the connector being used for cables comprising optical fibres or combinations of optical fibres and electrical wires. A plate 10 is pressed against the plate 9 by a metal end plug 11 attached to the back shell 6 by screw threads.

A conductive sleeve 12 is provided over the fibre 4 and passes through corresponding holes in the plates 9 and 10. A ring 13 of conductive "shape memory alloy" is provided over the sleeve 12 and is located in a recess surrounding the hole in the plate 9.

In order to assemble the screening arrangement to the connector, the optical fibre 4 is passed through the end plug 11, the sleeve 12, the plate 10, the ring 13, the plate 9, and the back shell 6 (into the groove 7 of which the circlip 8 has already been inserted), and is attached to the pole 3 of the connector. The arrangement thus resembles the exploded view of FIG. 2. The components shown in FIG. 2 are then slid along the optical fibre (and any other fibres or wires present) and the back shell 6 is screwed to the rear of the connector shell 2. The end plug 11 is screwed into the rear of the back shell 6 so as to press the plate 10 against the plate 9 and the plate 9 against the circlip 8. The ring 13 is thus compressed. Heat is applied to this assembly to cause the ring 13 to change its shape so as to grip the sleeve 12, which shrinks so as to grip the fibre 4 in order to provide strain relief. The ring 13 retains its new shape should the end plug 11 be removed and thus remains in place on the sleeve 12.

The sleeve 12 is a tight fit in the holes of the plates 9 and 10 and this, together with the entrapped ring 13, provides a conductive connection between the sleeve 12 and the plates 9 and 10. The plates 9 and 10 are a close fit within the back shell 6 and, together with the metal end plug 11, provide complete electrical connection to the back shell 6 around the whole peripheries of the plates 9 and 10. Thus, with the exception of the passage for the optical fibre 4 through the sleeve 12, the rear of the connector 1 is completely screened against electro-magnetic interference.

The sleeves 12 may be considered as wave guide attenuators and, depending on their construction and dimensions, can provide a cut-off frequency in excess of 40 gigahertz with an attenuation in the region of 40 to 50 decibels.

It is thus possible to use conventional connectors for harnesses including optical fibres without substantially impairing the screening of equipment from electro-magnetic interference. Because the optical fibres are substantially immune to electro-magnetic interference, the immunity of the system as a whole to electro-magnetic interference is substantially improved.

FIG. 3 illustrates a possible modification to the screening arrangement shown in FIGS. 1 and 2. The sleeve 12 contains a silver conductor layer 12a, which is exposed in the region of the sleeve 12 which passes through the holes in the plates 9 and 10 and through the ring 13. This arrangement provides an effective electrical connection bridging the whole of the inner surfaces of the plates 9 and 10 and the ring 13 to the layer 12a to provide a "ring" connection, while providing mechanical protection for the conductive layer 12a remote from the plates 9 and 10 and the ring 13.

Figure 4:
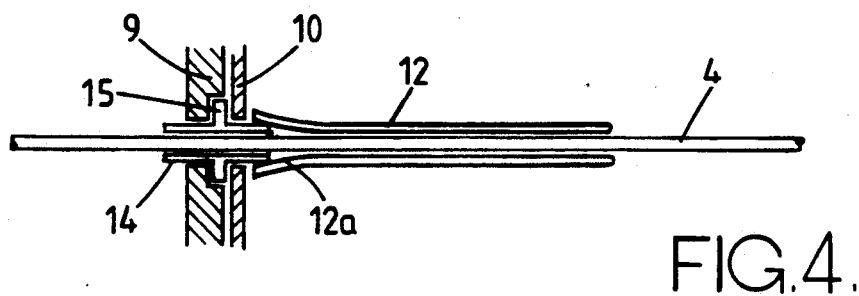

FIG. 4 shows another modification in which the ring 13 is replaced by a metal sleeve 14 with an annular shoulder 15. The sleeve 14 is crimped to the fibre 4 and the collar 15 is entrapped between the plates 9 and 10 so as to hold the fibre 4 in position. The sleeve 12 has an internal conductive layer 12a with one end of the sleeve being heat shrunk over an end of the metal sleeve 14 so that the layer 12a is in electrical contact with the metal sleeve 14.

Thus, the embodiment and modifications illustrated in FIGS. 1 to 3 use a sleeve 12 of conductive heat shrinkable material. The sleeve is positioned over the fibre 4 and then heated so that it shrinks and becomes fastened to the fibre. The sleeve 12 of FIG. 2 is wholly conductive or has an external conductive layer for forming an electrical connection to the other parts of the screening arrangement. In FIG. 3, an internal conductive layer of the sleeve 12 is exposed where the sleeve passes through the plates 9 and 10 and the ring 13 so as to provide electrical connection. In FIG. 4, the sleeve is effectively formed in two parts with the metal sleeve being crimped to the optical fibre 4 and being held in place by the plates 9 and 10 and the flexible sleeve 12 being slid along the fibre 4 and heat shrunk over an end of the metal sleeve 14 so that an internal conductive layer 12a makes an electrical connection to the metal sleeve 14.

Figure 5:
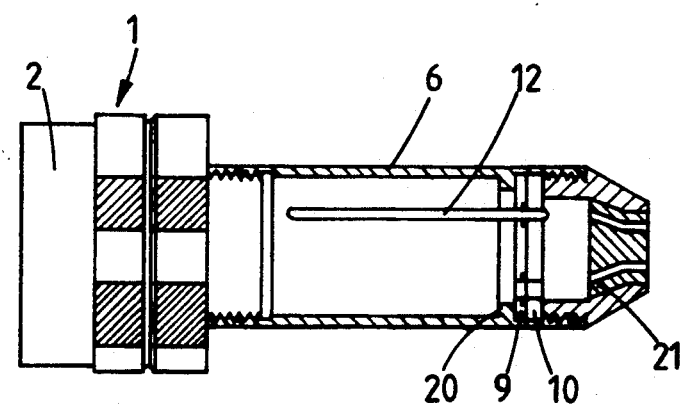
FIG. 5 is a part-sectional view of a connector and screening arrangement constituting a second embodiment of the invention.
Figure 6:
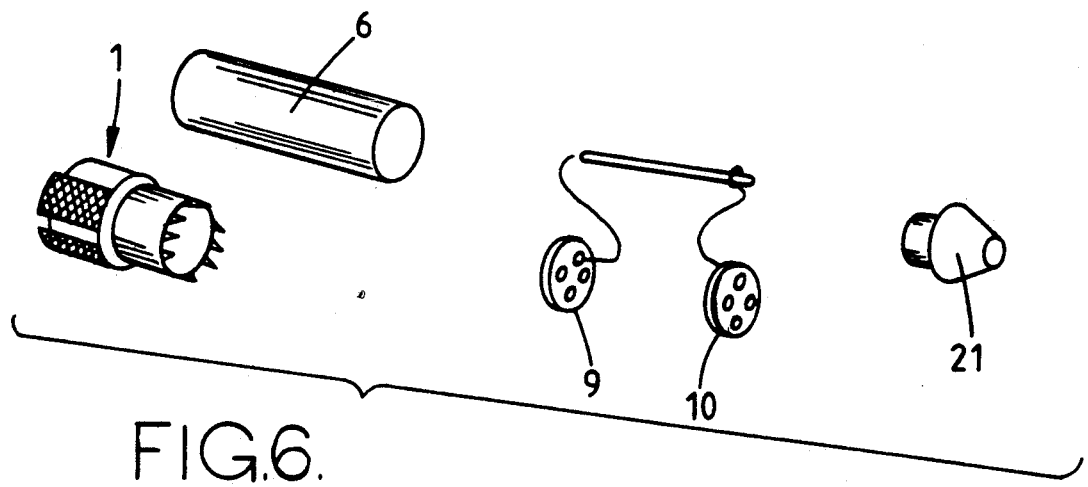
FIG. 6 is an exploded view of the screening arrangement of FIG. 5.

FIG. 5 and 6 illustrate another type of screening arrangement. Like reference numerals refer to like parts throughout the drawings and parts of the embodiment shown in FIGS. 5 and 6 which have been described with reference to the embodiment of FIGS. 1 to 4 will not be further described. Thus, the connector 1 has a metal back shell 6 attached by screw threads and contains plates 9 and 10 for the or each sleeve 12. The back shell 6 is elongated compared with the back shell 6 of FIG. 1 and the sleeve 12 comprises a small diameter metal tube with an integral collar resembling an extended version of the metal tube 14 shown in FIG. 4. The plates 9 and 10 are pressed against an internal annular shoulder 20 which is formed integrally with the back shell 6. A rubber bung 21 forms an environmental seal and compression plug and is screwed into the rear of the back shell 6 so as to press the plate 9, the plate 10, and the collar 20 together, thus providing a good electrical connection between the back shell 6 and the peripheries of the plates 9 and 10. The rubber bung 21 has a plurality of passages for the optical fibres and, when present, electrical wires.

Figure 7:
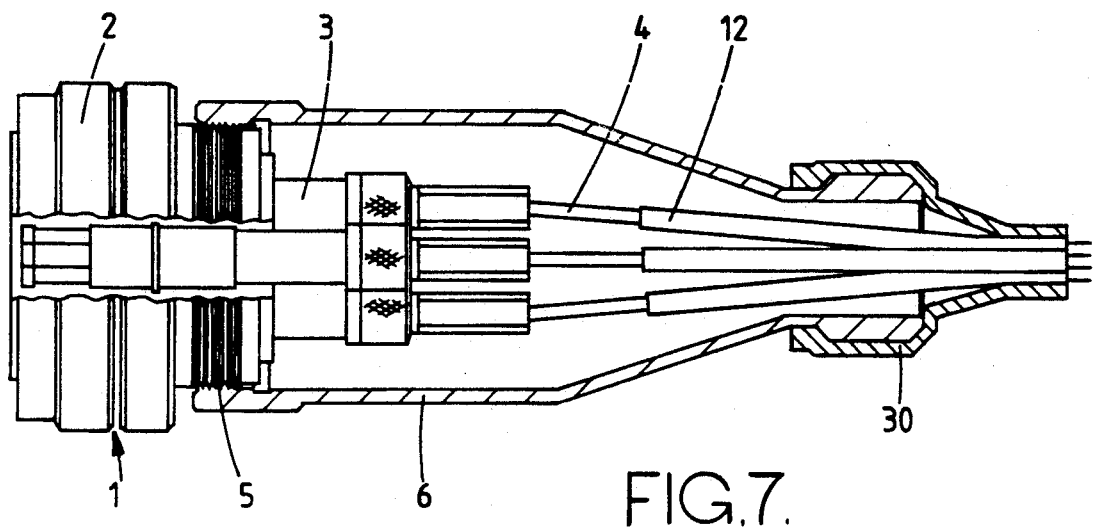
FIG. 7 is a part-sectional view of a connector and screening arrangement constituting a third embodiment of the invention.

The screening arrangement shown in FIG. 7 comprises a metallic back shell 6 attached to the shell 2 of a connector 1 by screw threading to the threaded cable entry end 5 of the connector. The back shell 6 has a cylindrical portion extending form the connector 1 into a conical portion towards a cable entry end of the back shell.

A plurality of optical fibres 4 extend from corresponding poles 3 through sleeves 12 made of heat-shrinkable plastics with outer metallisation so as to form waveguide attenuators. The cable entry end of the back shell 6 has a generally cylindrical portion over which is attached a boot 30 made of heat-shrinkable plastics having an internal metallisation. The optical fibres 4 enter through the rear of the boot 30, which after heat-shrinking forms a closed end in physical and electrical contact with the outer metallisation of the sleeves 12 which, in turn, have been hat-shrunk onto the individual optical fibres 4. Thus, the outer metallisation of the sleeves 12 is an electrical contact with the internal metallisation of the boot 30, which in turn is an electrical contact with the metal back shell 6. The screening arrangement thus provides complete electrical screening behind the connector 1 in the form of a Faraday cage broken only by the optical fibres 4 passing through the waveguide attenuators 12.

Figure 8:
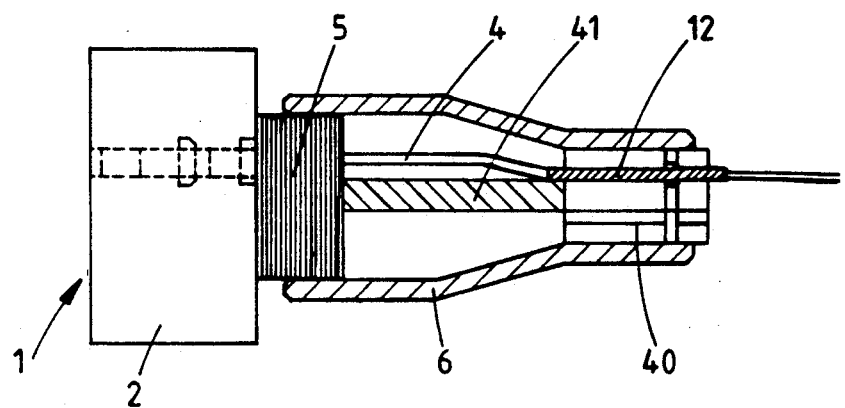
FIG. 8 is a part-sectional view of a connector and screening arrangement constituting a fourth embodiment of the invention.
Figure 9:
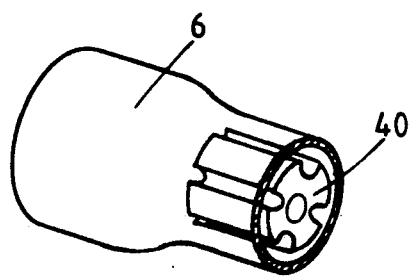
FIG. 9 is a diagrammatic view of the screening arrangement of FIG. 8.

The screening arrangement shown in FIG. 8 has a back shell 6 in the form of an internally metallised heat-shrinkable plastics material attached to the threaded portion 5 of the connector 1. The back shell 6 tapers inwardly away from the portion 5 and, after heat-shrinking, forms an interference fit over the portion 5 and over a conductive insert 40. The internal metallisation of the back shell 6 thus connects the conductive insert 40 to the shell 2 of the connector 1.

The sleeves 12 comprise metal tubes with annular collars, similar to those shown in FIGS. 5 and 6. The sleeves pass along peripheral grooves in the insert 40 with an annular groove being provided for the sleeve collars so as to prevent axial movement of the sleeves within the insert 40. The conductive insert 40 provides an electrical connection between the sleeves 12 and the internal metallisation of the back shell 6. A support pillar 41 is shown for providing mechanical support of the insert 40 on the rear of the connector 1. The insert 40 further provides strain relief at a harness end.

I claim:

1. A screening arrangement for a connector having a front end for mating with a mating connector, a rear end, and at least two poles for receiving at least two optical fibres entering the connector through the rear end, said screening arrangement comprising an electrically conductive housing arranged to be attached to the rear end of the connector, and at least two electrically conductive sleeves for passage of respective ones of the at least two optical fibres, said electrically conductive sleeves being electrically connected to said electrically conductive housing and forming electromagnetic waveguide attenuators, said electrically conductive housing being substantially closed about said at least two electrically conductive sleeves.

2. A screening arrangement as claimed in claim 1, in which said electrically conductive housing comprises electrically conductive means extending transversely of said electrically conductive housing and electrically connected to said at least two electrically conductive sleeves.

3. A screening arrangement as claimed in claim 2, in which said electrically conductive means comprises a conductive plate defining respective holes for passage of said at least two electrically conductive sleeves.

4. A screening arrangement as claimed in claim 2, in which said electrically conductive means comprises a conductive insert defining passages for said at least two electrically conductive sleeves.

5. A screening arrangement as claimed in claim 1, in which said electrically conductive housing comprises a metal shell of circular cross-section having a first end provided with a screw thread for attachment to the connector.

6. A screening arrangement as claimed in claim 5, in which said metal shell has a second end, said screening arrangement comprising a flexible boot extending from said second end of said metal shell and defining at least one aperture for passage of said at least two electrically conductive sleeves, said flexible boot having an internal electrically conductive surface for electrically connecting said at least two electrically conductive sleeves to said metal shell.

7. A screening arrangement as claimed in claim 1, in which said electrically conductive housing comprises a boot defining at least one aperture for passage of said at least two electrically conductive sleeves and having an internal electrically conductive surface in electrical connection with said at least two electrically conductive sleeves.

8. A screening arrangement as claimed in claim 1, in which at least one of said electrically conductive sleeves comprise a heat-shrinkable tube having an electrically conductive surface.

9. A screening arrangement as claimed in claim 1, in which at least one of said electrically conductive sleeves comprised a metal tube.

10. A screening arrangement as claimed in claim 9, in which said metal tube has a collar for axially fixing said metal tube with respect to said electrically conductive housing.

11. A screening arrangement as claimed in claim 10, in which said collar is integral with said metal tube.

12. A screening arrangement as claimed in claim 9, in which at least one of said electrically conductive sleeves further comprises an insulative tube having an electrically conductive internal surface and an end fixed over said metal tube.

13. A screening arrangement for a connector having a front end for mating with a mating connector, a rear end, and a pole for receiving an optical fibre entering the connector through the rear end, said screening arrangement comprising an electrically conductive housing arranged to be attached to the rear end of the connector, and an electrically conductive sleeve for passage of the optical fibre, said electrically conductive sleeve being electrically connected to said electrically conductive housing and forming an electromagnetic waveguide attenuator, said electrically conductive housing being substantially closed about said electrically conductive sleeve said electrically conductive housing comprising a metal shell of circular cross-section having first and second ends, said first end being provided with a screw thread for attachment to the connector, and said screening arrangement comprising a flexible boot extending from said second end of said metal shell and defining an aperture for passage of said electrically conductive sleeve, said flexible boot having an internal electrically conductive surface for electrically connecting said electrically conductive sleeve to said metal shell.

14. A screening arrangement for a connector having a front end for mating with a mating connector, a rear end, and a pole for receiving an optical fibre entering the connector through the rear end, said screening arrangement comprising an electrically conductive housing arranged to be attached to the rear end of the connector, and an electrically conductive sleeve for passage of the optical fibre, said electrically conductive sleeve being electrically connected to said electrically conductive housing and forming an electromagnetic waveguide attenuator, said electrically conductive housing comprising a boot being substantially closed about said electrically conductive sleeve and defining an aperture for passage of said electrically conductive sleeve, said boot having an internal electrically conductive surface in electrical connection with said electrically conductive sleeve.

15. A screening arrangement for a connector having a front end for mating with a mating connector, a rear end, and a pole for receiving an optical fibre entering the connector through the rear end, said screening arrangement comprising an electrically conductive housing arranged to be attached to the rear end of the connector, and an electrically conductive sleeve for passage of the optical fibre, said electrically conductive sleeve being electrically connected to said electrically conductive housing and forming an electromagnetic waveguide attenuator, said electrically conductive housing being substantially closed about said electrically conductive sleeve, said electrically conductive sleeve comprising a metal tube and an insulative tube having an electrically conductive internal surface and an end fixed over said metal tube.

* * * * *